United States Patent [19]

Elmore, III

[11] Patent Number: 4,797,007
[45] Date of Patent: Jan. 10, 1989

[54] TEMPERATURE AND LINE PRESSURE PROBE

[75] Inventor: John M. Elmore, III, Indianapolis, Ind.

[73] Assignee: Emhart Industries, Inc., Indianapolis, Ind.

[21] Appl. No.: 134,974

[22] Filed: Dec. 18, 1987

[51] Int. Cl.[4] .......................... G01L 7/00; G01K 1/14
[52] U.S. Cl. ........................................ 374/143; 73/756
[58] Field of Search .................... 73/756, 714; 374/143

[56] References Cited

U.S. PATENT DOCUMENTS

| | | | |
|---|---|---|---|
| 4,325,260 | 4/1982 | Takahashi et al. | 73/756 X |
| 4,414,851 | 11/1983 | Maglic | 73/756 X |
| 4,548,517 | 10/1985 | Kampmann | 73/714 X |
| 4,706,500 | 11/1987 | Hattori et al. | 73/728 |

OTHER PUBLICATIONS

Universal Sensors & Devices, Inc. Bulletin No. LR-8601 entitled "LR1000 Leak Rater", © 1986.

EMCO/Wheaton Brochure dated 10/85 and entitled "Line Leak Detector".

*Primary Examiner*—Daniel M. Yasich
*Attorney, Agent, or Firm*—Carl A. Forest

[57] ABSTRACT

A probe housing includes a cover and an aluminum base that comprises a plate and a threaded collar for screwing the base onto a pipe-T. A threaded bore permits liquid from the pipe-T to pass through the plate. A pressure transducer, comprises a transducer housing and a threaded coupling. The transducer, a circuit board, and a washer-shaped circuit board support are mounted in the probe housing with the threaded coupling passing through a hole in the circuit board and the circuit board support and screwing into the bore in the base plate so that the circuit board is firmly held between the transducer housing and the support. A temperature sensor is held in a cavity in the plate by thermally conductive adhesive and is separated from the liquid in the pipe-T by only a relatively thin portion of the base to sense the temperature of the liquid.

10 Claims, 2 Drawing Sheets

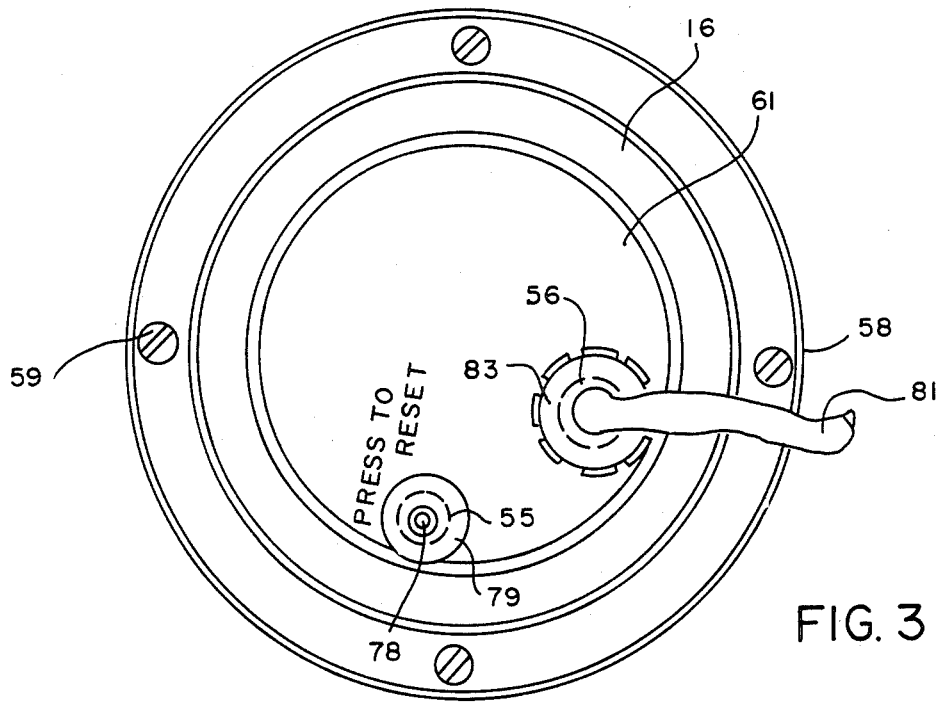
FIG. 3
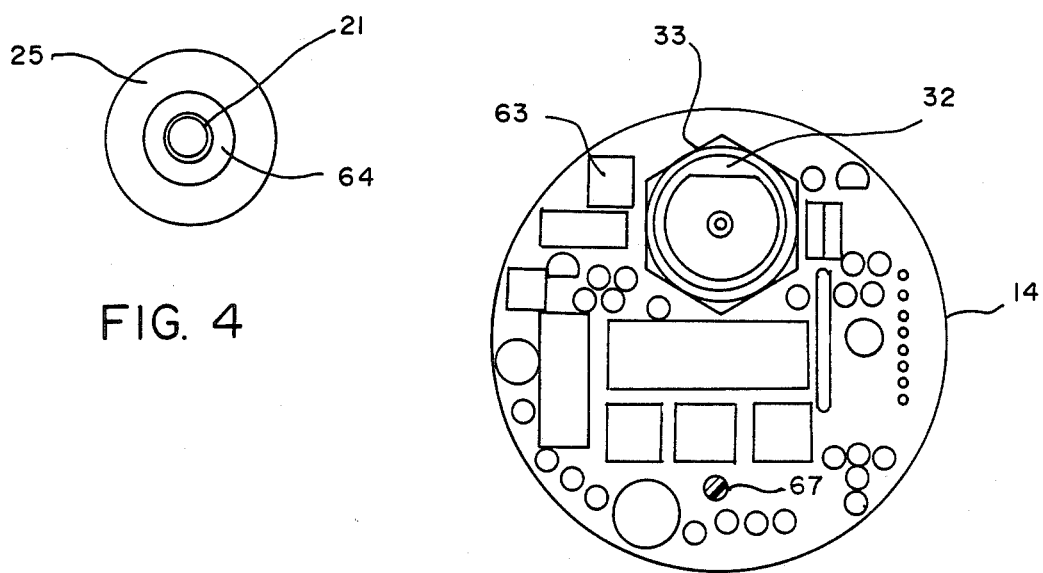
FIG. 4
FIG. 5

TEMPERATURE AND LINE PRESSURE PROBE

BACKGROUND OF THE INVENTION

1. Field of the Invention.

The invention in general relates to line pressure probes that are used in line leak detector systems, and more particularly with such a pressure probe which is able to provide a pressure signal that is more reliable representative of a line leak and more compact than prior art pressure probes.

2. Description of the Prior Art.

Line pressure probes have been widely used in the petroleum industry for many years. The line pressure probes generally report on the line pressure to a central monitor which utilizes the pressure data to provide warning of line leaks and to shut down pumps on lines that are leaking. Such pressure probes have become an essential part of hydrocarbon storage and dispensing facilities since even very small leaks can result in the loss of thousands of dollars of hydrocarbon, and because spills from leaks have become highly regulated and expenses of cleanup can be enormous.

Up to now most line pressure probes have consisted of line pressure switches which provide a signal if line pressure falls below a certain value, for example, 5 psi. These probes are susceptible to providing an erroneous leak indication when the pressure drop is due to temperature contraction. More recently line pressure probes which provide a continuous pressure reading and also provide the ground temperature have been available. Such probes allow the central monitor to analyze the pressure and temperature data to provide a more reliable indication of whether a leak has occurred. However, these prior art systems are all bulky, requiring spatial dimensions of the order of a foot or more. Moreover, they have generally included relatively thin parts, such as temperature probe extensions and mechanical levers connecting the probe to conduits and tanks. Since the areas in which the probes are used are often in relatively cramped underground locations or in locations where machines are commonly operated, it would be useful to have a compact probe with no extending parts.

SUMMARY OF THE INVENTION

It is an object of the invention to provide a line pressure probe that overcomes one or more disadvantages of the prior art line pressure probes.

It is another object of the invention to provide a line pressure probe that is compact and rugged.

It is a further object of the invention to provide a line pressure probe which provides one or more of the above objects and at the same time provides a pressure signal that is more reliably representative of a line leak than the signals provided by prior art line pressure probes.

The invention provides a line pressure probe for use on a liquid conduit, the probe comprising: pressure transducer means for providing an electrical signal representative of the pressure in the liquid conduit, the transducer means including a transducer housing and duct means for transmitting pressure from the liquid in the conduit to the interior of the transducer housing; a circuit board having circuit components mounted thereon and a hole through it; a circuit board support; probe housing means for enclosing the pressure transducer means and the circuit board, the housing including a base means for attaching the housing to the liquid conduit, the base means having a channel means through it for communicating with liquid in the conduit; and securing means for securing the transducer means to the base means; wherein the circuit board is mounted between the circuit board support and the transducer housing with the duct means passing through the hole in the board and connecting with the channel in the probe housing base means, whereby the securing means also secures the circuit board in the probe housing. Preferably, the duct means comprises a tubular coupling, the channel means comprises a cylindrical bore, and the securing means comprises threads on the tubular coupling and the bore. Preferably the circuit board support comprises an insulating member having an opening through it and the tubular coupling passes through the opening. Preferably, the base means comprises a plate-shaped member and cylindrical threaded collar means for screwing the housing base onto the liquid conduit. Preferably, the probe further comprises temperature sensing means for sensing the temperature of the liquid in said conduit. Preferably the temperature sensing means comprises at least a portion of said base means being formed of material that conducts heat well and a temperature sensor in thermal contact with said portion of said base means. Preferably, the base means further includes a cavity formed in the at least a portion of the base means that conducts heat well and the temperature sensor is held in the cavity with a thermally conductive adhesive. Preferably, the base means includes means for releasing liquid pressure in the liquid conduit without removing the probe housing from the conduit.

The probe construction according to the invention provides a simple means of securely holding a circuit board in a probe that requires remarkably few parts and is very compact. It also provides a compact, simple and effective means for including a conduit liquid temperature sensor in a probe. The net result is a probe that provides sophisticated electronic analysis of the probe signal within the probe itself and yet is more compact and rugged than prior art probes. Numerous other features, objects and advantages of the invention will become apparent from the following detailed description when read in conjunction with the accompanying drawings.

BRIEF DESCRIPTION OF THE DRAWINGS

In the drawings:

FIG. 3 is a top plane view of the line pressure probe of FIG. 1;

FIG. 4 is a cross-section of the circuit board supporting structure taken through line 4—4 of FIG. 1; and FIG. 5 is a plane view inside the probe housing of FIG. 1, looking down on the circuit board.

DESCRIPTION OF THE PREFERRED EMBODIMENT

Figure 1:
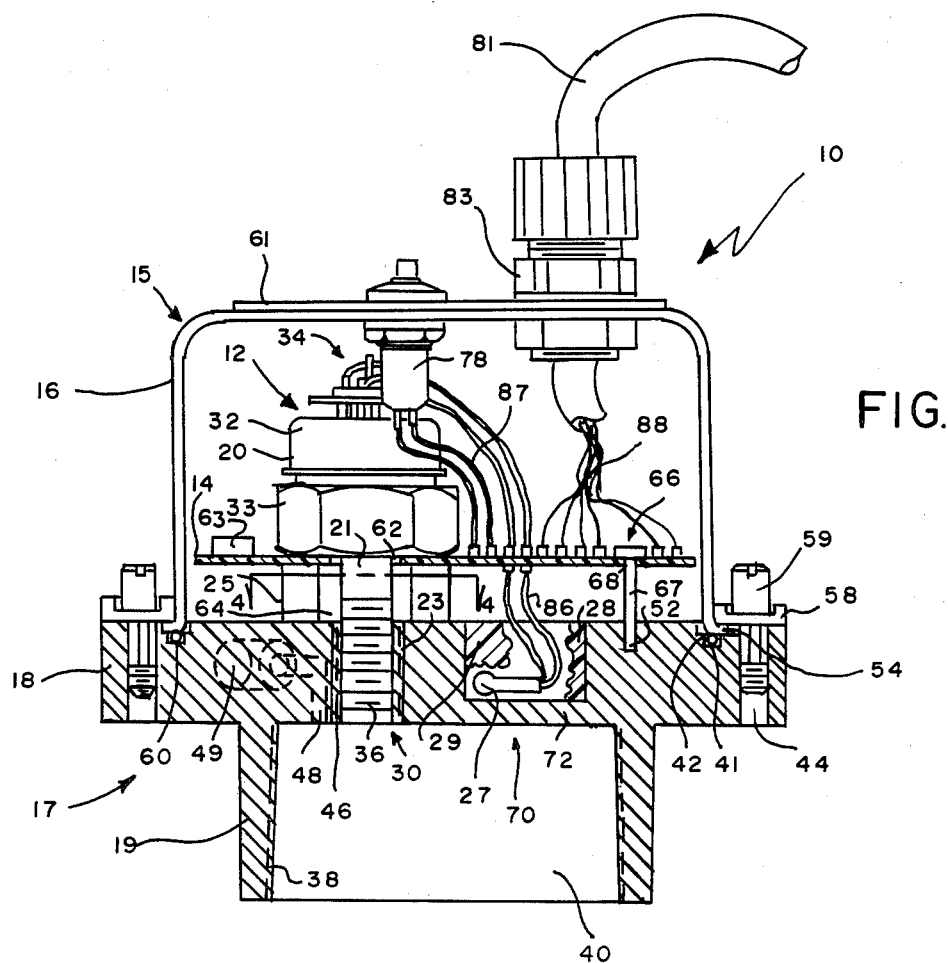
FIG. 1 is a cross section of the preferred embodiment of a line pressure probe according to the invention.
Figure 2:
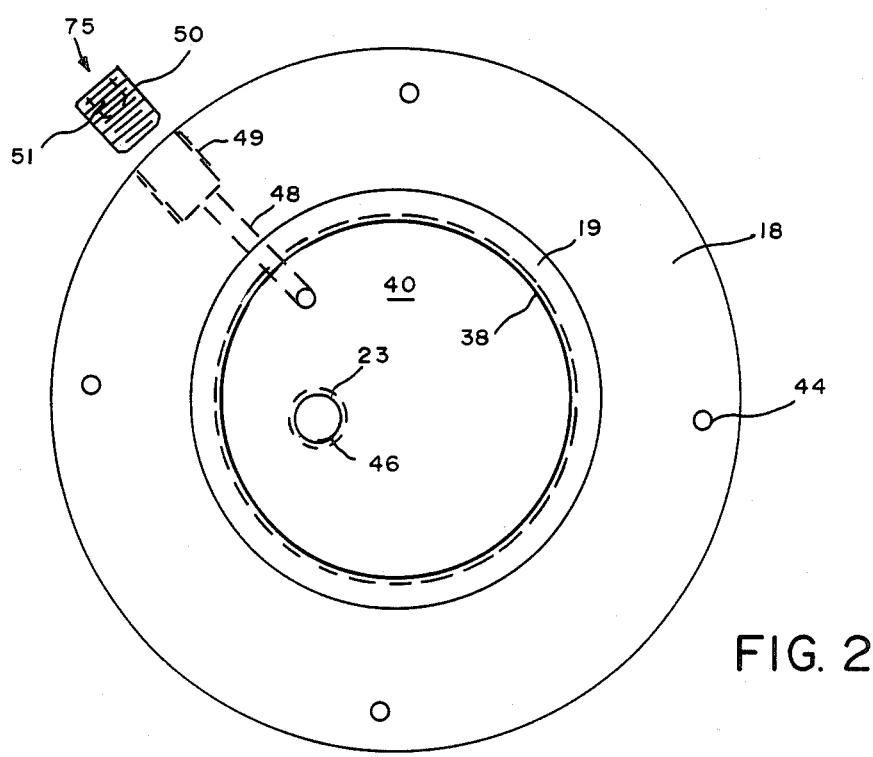
FIG. 2 is a bottom plane view of the line pressure probe of FIG. 1.

Directing attention to the FIGS., the preferred embodiment of a line pressure probe 10 according to the invention is shown. It is noted that the particular preferred embodiment shown is exemplary and not intended to be limiting. The embodiment includes a pressure transducer 12 and a circuit board 14 enclosed within a probe housing 15. The probe housing includes a cover 16 and a base 17 which comprises a plate-shaped member 18 and a threaded collar 19 for attaching the base to a fluid conduit. The pressure transducer 12 includes a transducer housing 20 and a threaded tubular coupling 21 which screws into a threaded bore 23 in base plate 18. A washer-shaped circuit board support 25 fits around the tubular coupling 21 and between the circuit board 14 and base plate 18. When the transducer 12 is screwed into bore 23, board 14 is firmly grasped between transducer housing 20 and circuit board support 25, securing it within the probe housing 15. A temperature sensor 27 is held in cavity 28 in plate 18 by a heat conductive adhesive material 29. The base 17 is preferably made of aluminum which easily conducts heat keeping sensor 27 at essentially the temperature of the liquid in the conduit (not shown) which the collar 19 is threaded onto.

Turning now to a more detailed description of the preferred embodiment, the line pressure probe 10 comprises a pressure transducer means 12 for providing an electrical signal representative of the pressure in a liquid conduit. The pressure transducer means includes a transducer housing 12 and a duct means 21 for permitting pressure from the conduit to be transmitted to the transducer housing 20. The transducer means 12 and circuit board 14 are enclosed in a probe housing means 15 which includes cover 16 and base means 17 for attaching the housing means 15 to a liquid conduit. The base means 17 has a channel 23 through it for communicating with liquid in the conduit. The probe also includes securing means 30 for securing the transducer means 12 to the base means 17. The transducer housing 12 includes an upper portion 32 which houses a piezoelectric transducer element (not shown) which produces the electrical pressure signal which is output over wires 34, and a hexagonally shaped portion 33 to which a wrench may be applied for tightening securing means 30. The duct means 21 is preferably a tubular coupling 21 having threads 36 formed on its outer surface. The housing base means preferably comprises a plate-shaped member 18 and a cylindrical threaded collar means 19 for screwing the housing base 17 to a pipe T or other part of a fluid conduit, the plate 18 and collar 19 are preferably cast as a single piece. Threads 38 are formed on the inner surface of the collar 19. The collar 19 forms a cavity 40 which liquid from the conduit will fill when the probe 15 is placed in use. The plate preferably has a pair of nested circular grooves 41 and 42 formed in it and four threaded bores 44 equally spaced near its outer circumference. As mentioned above, it also has a channel 23 passing through it which communicates with the cavity 40. Channel 23 preferably is a cylindrical bore 23 and has threads 46 formed in its inner surface which threads mate with threads 36. The means for securing the transducer 12 to the probe housing 15 preferably comprises threads 36 and 46. Plate 18 also has a cylindrical cavity 28 formed in its upper surface and a channel 48 communicating with another threaded bore 49 formed in its outer rim. Plug 50 fits into bore 49 to close it. Channel 48 runs radially along the plate 18 until it is within the inner diameter of collar 19 then turns perpendicularly and opens into cavity 40. Plate 18 also has another bore 52 formed in its upper surface. Housing cover 16 is cup-shaped with a circular flange 54 about its rim and two circular holes 55 and 56 (FIG. 3) formed in the cup "bottom". The housing 15 also includes cover retaining ring 58, cover retaining bolts 59, o-ring 60, and label 61. Circuit board 14 preferably has a circular hole 62 through it of sufficient diameter to pass coupling 21 and another smaller hold 68 large enough to pass pin 67. Electric circuit components, such as 63 are mounted on the circuit board 14. Circuit board support 25 preferably comprises a washer-shaped insulator being circular in shape with opposing flat sides and a circular opening 64 through it. The probe 10 also includes a means 66 for preventing the circuit board 14 from pivoting when the transducer 12 is screwed into threaded bore 23. The means 66 includes bore 52 and pin 67 which passes through hole 68 in circuit board 14 into bore 52. Pin 67 also acts as a locator pin for circuit board 14. The probe 10 further includes a temperature sensing means 70 for sensing the temperature of the liquid in the conduit. Preferably, the temperature sensing means 70 includes at least a portion of the base means 17 being formed of a material that conducts heat well, and a temperature sensor 27. In the preferred embodiment, the whole base 17 is formed of a material that conducts heat well, preferably aluminum. Preferably temperature sensor 27 is located in cavity 28 in plate 18 which results in only a relatively thin wall 72 separating it from the liquid in cavity 40. The temperature sensor 27 is preferably held in the cavity 28 by thermally conducting adhesive 29. The probe 10 also includes a means 75 for releasing liquid pressure in the liquid conduit without removing the probe 10 from the conduit. The means 75 for releasing preferably includes channel 48, bore 49 and plug 50. Plug 50 is preferably a ¼-inch NPT plug having a hexagonal drive socket 51. Bore 49 is threaded to accept plug 50. Other components of the probe 10 include reset switch 78, which is secured in hole 55 in cover 16 by means of mounting hardware provided with the switch, and eight wire cable 81, which is secured in hole 56 by means of feed-through connector 83.

The probe 10 is preferably assembled by inserting temperature sensor 27 attached to wires 86 in cavity 28 and filling the cavity with thermal conductive adhesive 29, then inserting pressure transducer coupling 21 through hole 62 in circuit board 14 and hole 64 in circuit board support 25, inserting pin 67 through hole 68 in circuit board 14 and into bore 52 in plate 18, then screwing the transducer coupling 21 into threaded bore 3 until the circuit board is firmly gripped between transducer housing 20 and support 25; label 61 is applied to cover 16, then switch 78 is mounted to cover 16 with hardware provided with the switch, and cable 81 is mounted to the cover 16 with connector 83; o-ring 60 is placed in groove 41 and cover 16 is placed over the circuit board 14 and transducer 12 with flange 54 in groove 42, then retainer 58 is placed over the flange 58 and bolts 59 are screwed into bores 44 to hold the cover 16 in place. Wires 34, 86, 87 and 88 are attached to circuit board 14 during the above operations at appropriate stages to facilitate the assembly. Epoxy sealant may be applied to coupling 21 and RTV silicon adhesive may be applied to connecter 83 before assembling them.

In the preferred embodiment collar 19 is two inches NPT nominal size, bore 23 is one-fourth inches NPT nominal size, plug 50 is a one-fourth inch NPT plug, channel 48 is about one-eighth inches in diameter and bolts 59 are 8–32 bolts. Base 17 is preferably cast out of aluminum with channel 48 rough cast by sand casting methods, cavity 40 rough-formed in the mold, and the other Cavities and bores bored after casting. In the preferred embodiment, base 17 is made of aluminum.

Cover 16, retainer 58, bolts 59, coupling 21, and transducer housing 20 are made of stainless steel. Support 25 is made of Nitrile ™ and o-ring 60 is made of Viton ™, adhesive 29 is preferably Output Thermally Conductive Adhesive made by Loctite Electronics Division, 705 North Mountain Road, Newington, Conn. 66111. Label 61 is mylar backed with pressure-sensitive adhesive, connector 83 is a Hubbell ™ pass-through connector, and cable 81 is an eight-wire-plus-drain wire (shield) cable. Switch 78 is a part No. P7-331222 made by Otto Controls Division of Otto Engineering, Inc., 2 Main Street, Carpentersville, IL 60110. Pressure transducer 12 is preferably a Foxboro ™ type 1221-07-G-K-4-L and the temperature sensor 27 preferably an Amperex ™ type KTY81-110 silicon temperature sensor. Circuit board 14 is a double-sided-plated-through board conventionally made of fiber glass.

The probe 10 is utilized by screwing it on to a pipe-T or other threaded conduit by means of threaded collar 19. When the conduit is filled with liquid, the liquid will fill cavity 40 and pass through bore 23 and coupling 21 into the transducer housing 20 where it presses against a metal diaphragm to compress a piezoelectric element which produces an electrical signal representative of the liquid pressure in the conduit. The signal from transducer 12 is passed to circuit board 14 via wires 34 is analyzed and processed by the electronics mounted on the board. The electronic components 63 on board 14 include a circuitry. This electronics which is compactly and securely carried in the housing 16 by the inventive features of the probe permits the signal from transducer 12 to be analyzed and processed so that the resulting signal from the probe on cable 81 indicates the conditions in the liquid conduit much more accurately and reliably.

It is a feature of the invention that the circuit board is supported within the probe housing 15 much more strongly than by the usual brackets etc. that are used to support circuit boards. However, the placement of the circuit board support 25 and the tension and counter-tension between the plate 18, support 25, board 14 and transducer housing 20 also tend to firmly hold the transducer 12 in the probe housing 15. The whole at the same time provides a very compact package, with the transducer 12, the temperature sensor 27, and the circuit board components 63 forming a generally spherical package that is space efficient and yet with sufficient spacing between the electrical components to prevent heating and other interference problems.

A novel line pressure probe that provides a rugged, compact probe containing sophisticated electronics that can operate reliably underground or in other environments that are likely to contain ground water and hazardous liquids and has numerous other features has been described. It is evident that those skilled in the art may now make numerous uses and modifications of and departures from the specific embodiments described herein without departing from the inventive concepts. For example, equivalent electronic components and other materials may be substituted. Additional features can be added. Many other variations can be made. The Probe can be employed in systems storing liquids other than gasoline Consequently, the invention is to be construed as embracing each and every novel feature and combination of features present in and/or possessed by the line pressure probe described.

What is claimed is:

1. A line pressure probe for use on a liquid conduit, said probe comprising:

pressure transducer means of providing an electrical signal representative for the pressure in said liquid conduit, said transducer means including a transducer housing and duct means for transmitting pressure from the liquid in said conduit to the interior of said transducer housing;

a circuit board having circuit components mounted thereon and a hole through it;

a circuit board support;

probe housing means for enclosing said pressure transducer means and said circuit board, said probe housing means including base means for attaching said probe housing means to said liquid conduit, said base means having a channel means through it for communicating with liquid in said conduit; and securing means for securing said transducer means to said base means;

wherein said circuit board is mounted between said circuit board support and said transducer housing with said duct means passing through said hole in said board and connecting with said channel in said probe housing base means, whereby said securing means also secures said circuit board in said probe housing.

2. A line pressure probe as in claim 1 wherein said duct means comprises a tubular coupling, said channel means comprises a cylindrical bore, and said securing means comprises threads on said tubular coupling and in said bore.

3. A line pressure probe as in claim 2 wherein said circuit board support comprises an insulating member having an opening through it and said tubular coupling passes through said opening.

4. A line pressure probe as in claim 2 and further comprising means for preventing said circuit board from pivoting when said transducer means is secured to said base means.

5. A line pressure probe as is claim 4 wherein said means for preventing comprises a second bore in said base means and a pin, said pin passing through said circuit board and into said second bore.

6. A line pressure probe as in claim 1 wherein said base means comprises a plate-shaped member and cylindrical threaded collar means for screwing said housing base onto said liquid conduit.

7. A line pressure probe as in claim 1 and further comprising temperature sensing means for sensing the temperature of the liquid in said conduit.

8. A line pressure probe in claim 7 wherein said temperature sensing means comprises at least a portion of said base means being formed of material that conducts heat well and a temperature sensor in thermal contact with said base means.

9. A line pressure probe as in claim 8 wherein said base means further includes a cavity formed in said at least a portion that conducts heat well and said temperature sensor is held in said cavity with a thermally conductive adhesive.

10. A line pressure probe as in claim 1 and wherein said base means includes means for releasing liquid pressure in said liquid conduit without removing said probe housing from the conduit.

* * * * *